(12) United States Patent
Shirasaka et al.

(10) Patent No.: US 9,174,131 B2
(45) Date of Patent: Nov. 3, 2015

(54) USER INTERFACE PROCESSING APPARATUS, METHOD OF PROCESSING USER INTERFACE, AND PROGRAM FOR PROCESSING USER INTERFACE

(75) Inventors: Kouichi Shirasaka, Tokyo (JP); Takao Suzuki, Tokyo (JP); Okinori Yasuta, Tokyo (JP); Takehiro Ando, Tokyo (JP); Hidetoshi Aoyagi, Tokyo (JP)

(73) Assignee: KABUSHIKI KAISHA SQUARE ENIX, Tokyo (JP)

( * ) Notice: Subject to any disclaimer, the term of this patent is extended or adjusted under 35 U.S.C. 154(b) by 894 days.

(21) Appl. No.: 12/981,705

(22) Filed: Dec. 30, 2010

(65) Prior Publication Data

US 2011/0172013 A1 Jul. 14, 2011

(30) Foreign Application Priority Data

Jan. 6, 2010 (JP) .................................. 2010-000862

(51) Int. Cl.
*A63F 9/24* (2006.01)
*A63F 13/2145* (2014.01)
(Continued)

(52) U.S. Cl.
CPC ........... *A63F 13/2145* (2014.09); *A63F 13/214* (2014.09); *A63F 13/426* (2014.09); *A63F 13/533* (2014.09); *A63F 13/822* (2014.09); *A63F 13/92* (2014.09); *G06F 3/0488* (2013.01)

(58) Field of Classification Search
CPC ............... A63F 2300/1068; A63F 2300/1075; A63F 2009/2408; A63F 2009/241; A63F 13/00; A63F 13/06; A63F 2300/00; A63F 2300/204; A63F 13/2145; A63F 13/214; A63F 13/92

USPC .............. 463/37, 36, 38, 1, 31; 345/173, 175; 700/83; 340/815.4
See application file for complete search history.

(56) References Cited

U.S. PATENT DOCUMENTS 4,353,552 A * 10/1982 Pepper, Jr. ...................... 463/37
7,309,287 B2 * 12/2007 Miyamoto et al. .............. 463/37
(Continued)

FOREIGN PATENT DOCUMENTS

JP 11-212726 8/1999
JP 11212726 A * 8/1999
(Continued)

OTHER PUBLICATIONS

<Death Worm game on itunes, http://web.archive.org/web/20101111012513/http://itunes.apple.com/us/app/death-worm/id396669943?mt=8, Play Creek, Nov. 11, 2010>.*
(Continued)

*Primary Examiner* — William H McCulloch, Jr.
*Assistant Examiner* — Chase Leichliter
(74) *Attorney, Agent, or Firm* — Greenblum & Bernstein, P.L.C.

(57) ABSTRACT

A user interface processing apparatus for controlling an application is provided. In the user interface processing apparatus, a touch on a display screen by means of a contact operation by a user on a touch panel is received. A touched position on the touch panel is detected when the touch on the display screen is received. The touched position is a position touched by the player on the display screen. A virtual controller is displayed at a predetermined position on the display screen corresponding to the detected touched position in a case where the touch on the display screen is received. An operation of the virtual controller displayed on the display screen is received from the player. The application is controlled in accordance with the operation received from the player.

14 Claims, 10 Drawing Sheets

(51) Int. Cl.
*A63F 13/214* (2014.01)
*A63F 13/92* (2014.01)
*G06F 3/0488* (2013.01)
*A63F 13/426* (2014.01)
*A63F 13/533* (2014.01)
*A63F 13/822* (2014.01)

(56) References Cited

U.S. PATENT DOCUMENTS

| | | | |
|---|---|---|---|
| 7,578,742 B2 * | 8/2009 | Miyamoto et al. | 463/37 |
| 2004/0263487 A1 * | 12/2004 | Mayoraz et al. | 345/173 |
| 2005/0099400 A1 * | 5/2005 | Lee | 345/173 |
| 2006/0026535 A1 * | 2/2006 | Hotelling et al. | 715/863 |
| 2006/0111180 A1 * | 5/2006 | Cheng | 463/36 |
| 2007/0150842 A1 | 6/2007 | Chaudhri et al. | |
| 2007/0200820 A1 * | 8/2007 | Svensson et al. | 345/156 |
| 2008/0207323 A1 | 8/2008 | Hiroshige et al. | |
| 2008/0207324 A1 | 8/2008 | Hiroshige et al. | |
| 2010/0045623 A1 * | 2/2010 | Sakurai | 345/173 |
| 2010/0162128 A1 * | 6/2010 | Richardson et al. | 715/744 |
| 2010/0214234 A1 * | 8/2010 | Singhal | 345/173 |
| 2010/0238131 A1 * | 9/2010 | Aoyagi | 345/173 |
| 2010/0299622 A1 * | 11/2010 | Sako et al. | 715/764 |

FOREIGN PATENT DOCUMENTS

| | | |
|---|---|---|
| JP | 2002-000939 | 1/2002 |
| JP | 2008-183047 | 8/2008 |

OTHER PUBLICATIONS

<Death Worm game, http://www.playcreek.com/deathworm/, Play Creek, copyright 2009>.*
Final Fantasy Dimensions, http://finalfantasy.wikia.com/wiki/Final_Fantasy_Dimensions, Mar. 18, 2013.*
Graham McAllister, A Guide to iOS Twin Stick Shooter Usability, Mar. 31, 2011, <http://www.gamasutra.com/view/feature/134693/a_guide_to_ios_twin_stick_shooter_.php>.*
Dave Flodine, Minigore Review, Jul. 31, 2009, <http://www.appspy.com/review/3226/minigore>.*
Damian Chiappara, Boxhead—The Zombie Wars Review, Oct. 16, 2009, <http://www.appspy.com/review/3994/boxhead-the-zombie-wars>.*
Andrew Nesvadba, Meteor Blitz Review, Sep. 16, 2009, <http://www.appspy.com/review/3830/meteor-blitz>.*
Dave Flodine, Assassin's Creed—Altair's Chronicles Review, Jul. 2, 2009, <http://www.appspy.com/review/3728/assassins-creed-altars-chronicles>.*
Japan Office Action in JP Patent Application No. 2010-000862, dated Nov. 29, 2011, along with an English translation thereof.
U.S. Appl. No. 12/954,993 to Takashi Ohara et al., filed Nov. 29, 2010.
Extended European Search Report from E.P.O. in EP Application No. 11150168, mail date is Jan. 25, 2012.
Precentraldotnet: "Palm Pre Setup and Gestures", XP002666911, Retrieved from the Internet: URL:http://www.youtube.com/watch?v=kOuvfDrBjbE [Retrieved on Jan. 11, 2012], May 31, 2009, pp. 1-11.
Dieter Bohn: "Palm Pre Review", XP002666910, Retrieved from the Internet: URL:http://www.webosnation.com/palm-pre-review [Retrieved on Jan. 11, 2012], Jun. 12, 2009, pp. 1-22.
European Official Communication issued in European Patent Application No. 11150168.0, dated Sep. 27, 2012.

* cited by examiner

VIRTUAL CONTROLLER MANAGING TABLE

| CHARACTER ID | OPERATIONAL OBJECT FLAG | DISPLAY POSITION OF VIRTUAL CONTROLLER (INITIALLY PRESSED POSITION) | RUNNING ACTION (CENTER OF OPERATING SECTION IS SEPARATED FROM INITIAL POSITION BY MORE THAN PREDETERMINED DISTANCE) | RUNNING ACTION (PART OF OPERATING SECTION IS POSITIONED OUTSIDE CONTROLLER BODY) | ... |
|---|---|---|---|---|---|
| 001 | 1 | (x1,y1) | 1 | 0 | ... |
| 002 | 0 | — | — | — | ... |
| ... | ... | ... | ... | ... | ... |

Fig. 2

USER INTERFACE PROCESSING APPARATUS, METHOD OF PROCESSING USER INTERFACE, AND PROGRAM FOR PROCESSING USER INTERFACE

CROSS-REFERENCE TO RELATED APPLICATION

The present application relates to subject matter contained in Japanese Patent Application No. 2010-000862, filed on Jan. 6, 2010, the disclosure of which is expressly incorporated herein by reference in its entirety.

BACKGROUND OF THE INVENTION

1. Field of the Invention

The present invention relates to technique for a user interface applied to a device for controlling various kinds of applications such as video games, for example.

2. Description of the Related Art

Heretofore, various kinds of video games such as a video game called an RPG (role-playing game: a game in which a player plays a role of a character in a world of the game, and accomplishes a predetermined object while enjoying a process that the character grows through various experiences), a simulation game and the like have been provided.

In recent years, as such video games, various kinds of video games, which allow a player to intuitively carry out various kinds of operations using a touch panel or the like, have been proposed.

In order to operate an object such as a character displayed on a display screen in a game using a touch panel, conventionally, a virtual controller or an action icon is displayed on a display screen and an operation input by a user or player is received using this virtual controller or the like.

As such a game, Japanese Patent Application Publication No. 2008-183047, for example, describes a game in which a player makes a touch input on an image to move it into a predetermined area on a display screen and makes a touch input on an image region of a determination button to progress the game.

However, in such a conventional video game, the virtual controller or the like for receiving an operation input from a user is fixedly displayed at a predetermined position on a display screen. Therefore, there has been a problem in which disadvantage may occur that a display portion of the virtual controller becomes a blind area and a game item and the like displayed in the portion become invisible.

The problem described above is not limited to a video game, and the similar problem has also been inherent in various kinds of other applications.

SUMMARY OF THE INVENTION

The present invention has been made in order to solve the problem described above, and it is an object of the present invention to solve the above problems, that is, to improve operability of a touch device.

In order to achieve the above object, in one aspect of the present invention, the present invention is directed to a user interface processing apparatus. The user interface processing apparatus according to the present invention includes a touch receiver that receives a touch on a display screen by means of an operation by a user or player for contacting a touch panel.

The user interface processing apparatus also includes a touched position detector that detects a touched position on the display screen when the touch receiver receives the touch on the display screen.

The user interface processing apparatus also includes a virtual controller display controller that displays a virtual controller at a predetermined position on the display screen corresponding to the touched position detected by the touched position detector in a case where the touch receiver receives the touch on the display screen.

The user interface processing apparatus also includes an operation receiver that receives an operation of the virtual controller displayed on the display screen by the user.

The user interface processing apparatus also includes an application controller that controls the application in accordance with the operation received by the operation receiver.

By configuring the user interface processing apparatus as described above, it is possible to improve operability of a touch device.

Namely, the virtual controller is displayed at an arbitrary point on the display screen, and an operational target object can be operated in accordance with a change in a touched position until the touch on the touch panel is terminated. Therefore, it is possible to prevent an important portion from becoming a blind area by displaying the virtual controller at a portion that is not important on the game screen, for example.

Further, since the virtual controller is arranged at an arbitrary position, operability of the touch device is hardly deteriorated in accordance with a size of a hand of the user and a method of gripping the touch device (for example, a position at which it is easy for the user to carry out a touch operation may be different depending upon whether the user grips the touch device so that the display screen is oriented laterally or vertically).

In the user interface processing apparatus according to the present invention, it is preferable that the user interface processing apparatus further includes a touch termination determiner that determines, after the touch receiver receives the touch on the display screen, whether a touched state on the display screen is terminated or not, wherein the virtual controller display controller terminates displaying the virtual controller when the touch termination determiner determines that the touched state is terminated.

In the user interface processing apparatus according to the present invention, it is preferable that the touched position detector continuously detects the touched position until the touched state is terminated after the touch receiver receives the touch on the display screen, wherein the operation receiver receives a moving direction instruction operation specified by a direction from an initial touched position to a current touched position, the initial touched position being a position detected by the touched position detector when the touch receiver first receives the touch on the display screen, the current touched position being a position on the display screen currently detected by the touched position detector after the initial touched position is detected, and wherein the application controller moves an object in the application in a direction from the initial touched position to the current touched position in accordance with the moving direction instruction operation received by the operation receiver.

In the user interface processing apparatus according to the present invention, it is preferable that the virtual controller includes a controller body formed in a substantially circular shape and an operating section capable of moving in an arbitrary direction from a center position of the controller body, wherein the virtual controller display controller fixedly displays the controller body at the predetermined position corresponding to the initial touched position, and displays the operating section movably in a direction from the initial touched position to the current touched position using a center position of the controller body as a base point.

In the user interface processing apparatus according to the present invention, it is preferable that the operation receiver receives a movement speed instruction operation that is specified based upon a distance between the initial touched position and the current touched position, wherein the application controller moves the object at a speed according to the distance between the initial touched position and the current touched position in accordance with the movement speed instruction operation received by the operation receiver.

In the user interface processing apparatus according to the present invention, it is preferable that the virtual controller includes a controller body formed in a substantially circular shape and an operating section capable of moving in an arbitrary direction from a center position of the controller body, wherein the virtual controller display controller fixedly displays the controller body at the predetermined position corresponding to the initial touched position, and displays the operating section so as to move away from the initial touched position in a stepwise manner in accordance with the distance between the initial touched position and the current touched position in a direction from the initial touched position to the current touched position using a center position of the controller body as a base point.

In the user interface processing apparatus according to the present invention, it is preferable that the virtual controller display controller increases or decreases transparency of the virtual controller in accordance with the distance between the initial touched position and the current touched position.

In the user interface processing apparatus according to the present invention, it is preferable that the virtual controller display controller displays the virtual controller in a case where the touched state on the display screen continues for a predetermined period of time after the touch receiver first receives the touch on the display screen.

In the user interface processing apparatus according to the present invention, it is preferable that the user interface processing apparatus is a video game processing apparatus for controlling a progress of a video game as the application.

Further, in another aspect of the present invention, the present invention is directed to a user interface processing method of controlling an application. The user interface processing method according to the present invention includes receiving a touch on a display screen by means of an operation by a user for contacting a touch panel.

The user interface processing method also includes detecting a touched position on the display screen when the touch on the display screen is received.

The user interface processing method also includes displaying a virtual controller at a predetermined position on the display screen corresponding to the detected touched position in a case where touch on the display screen is received.

The user interface processing method also includes receiving an operation of the virtual controller displayed on the display screen by the user.

The user interface processing method also includes controlling the application in accordance with the received operation.

Moreover, in still another aspect of the present invention, the present invention is directed to a computer program product for processing a user interface so as to control an application. The computer program product according to the present invention causes a computer to execute steps including receiving a touch on a display screen by means of an operation by a user for contacting a touch panel.

The steps also include detecting a touched position on the display screen when the touch on the display screen is received.

The steps also include displaying a virtual controller at a predetermined position on the display screen corresponding to the detected touched position in a case where touch on the display screen is received.

The steps also include receiving an operation of the virtual controller displayed on the display screen by the user.

The steps also include controlling the application in accordance with the received operation.

According to the present invention, it is possible to improve operability of a touch device.

BRIEF DESCRIPTION OF THE DRAWINGS

The foregoing and other objects, features and advantages of the present invention will become more readily apparent from the following detailed description of a preferred embodiment of the present invention that proceeds with reference to the appending drawings:

FIG. 2 is an explanatory drawing showing an example of a storage state of virtual controller information;

DETAILED DESCRIPTION OF THE INVENTION

Hereinafter, examples of one embodiment according to the present invention will be described with reference to the appending drawings.

Figure 1:
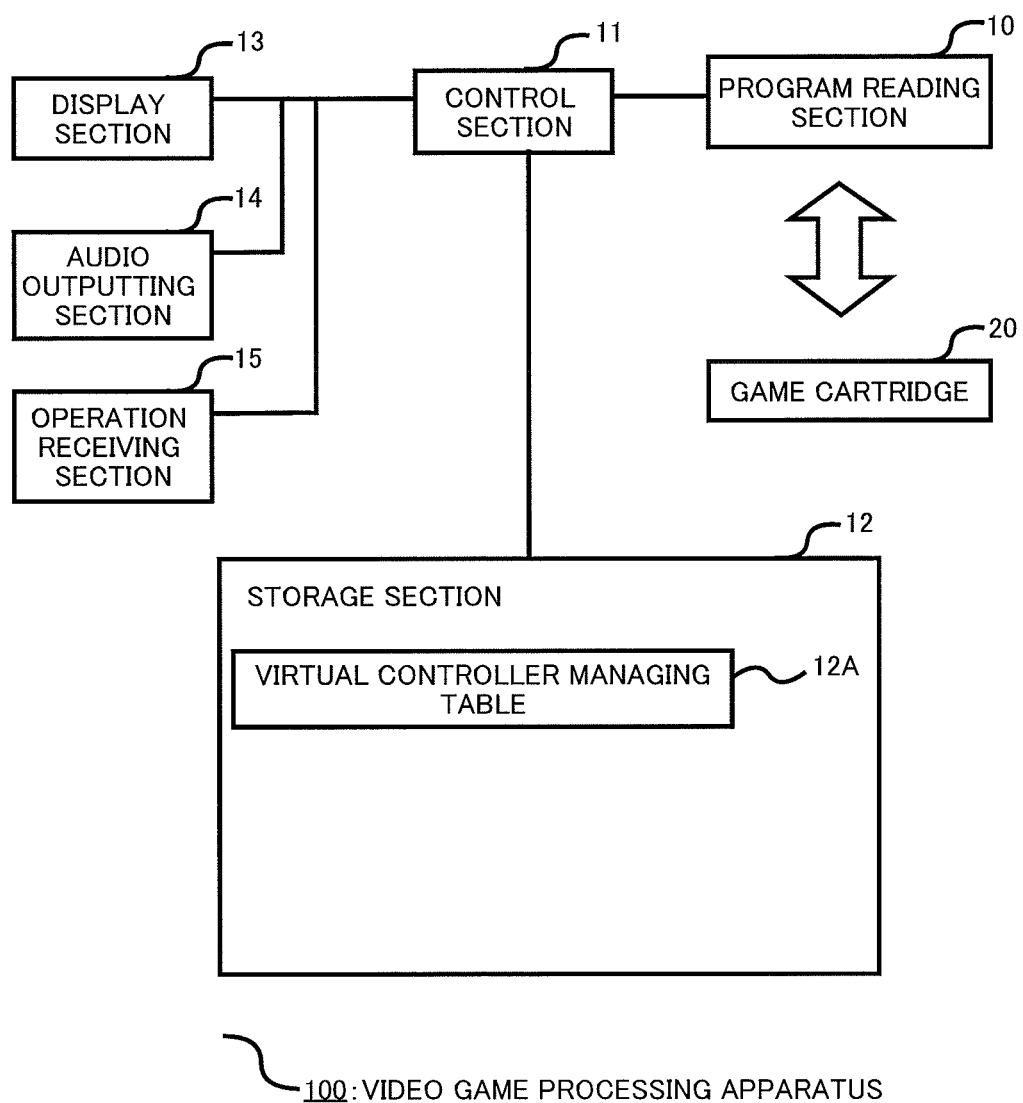
FIG. 1 is a block diagram showing an exemplary configuration of a video game processing apparatus according to one embodiment of the present invention.

FIG. 1 is a block diagram showing an exemplary configuration of a video game processing apparatus 100 showing one embodiment of the present invention. As shown in FIG. 1, the video game processing apparatus 100 includes: a program reading section 10; a control section 11; a storage section 12; a display section 13; an audio outputting section 14; and an operation receiving section 15.

The program reading section 10 has a function to read out a necessary video game program from the storage section 12 into which a storage medium, in which various kinds of video game programs are stored, is embedded. In this regard, in the present embodiment, the program reading section 10 has a mounting section into which the game cartridge 20 storing the video game program is detachably mounted. The program reading section 10 reads out the video game program from the storage medium of the game cartridge 20, which is mounted into the mounting section by a player (i.e., an operator or a user of the video game processing apparatus 100), to store the read-out video game program in the storage section 12. In this regard, a video game used in the present embodiment and carried out in accordance with the video game program may be a video game such as an RPG, a simulation game, a puzzle game or a battle game, so long as the video game is the one in which an object that can move in a virtual space of the video game in response to an operation by the player exists.

The control section 11 has a function to carry out game programs read out by the program reading section 10 and stored in the storage section 12 and a function to carry out various kinds of controls to cause the video game to proceed in accordance with operations by the player.

The storage section 12 is a storage medium for storing a video game program required when the video game is caused to proceed and various kinds of data. The storage section 12 is configured by a nonvolatile memory such as a RAM, for example. Various kinds of information to be registered and updated in accordance with progress of the game, and various kinds of information read out from a storage medium embedded in the game cartridge 20 for using the game are stored in the storage section 12.

In this regard, the video game processing apparatus 100 may be configured so that the video game program is downloaded from a game program providing server (not shown in the drawings) via a communication network such as the Internet and is stored in the storage section 12.

In the present embodiment, the storage section 12 contains a virtual controller managing table 12a in which virtual controller information is contained. The control section 11 refers to the virtual controller information when a virtual controller is displayed on a display screen. The virtual controller is used for receiving, from the player, an operation input for a predetermined object (in the present embodiment, a player character which can be operated by the player) in the virtual space of the video game displayed on the display screen of the display section 13.

FIG. 2 is an explanatory drawing showing an example of a storage state of virtual controller information stored in the virtual controller managing table 12a. As shown in FIG. 2, the virtual controller information contains a character ID, an operational target flag, coordinate information and action execution conditions for a player character. The character ID is used for uniquely specifying the player character. In the operational target flag, "1" is set to a player character that becomes an operational target by the player, and "0" is set to player characters that do not become an operational target. The coordinate information indicate a display position of the virtual controller on the display screen of the display section 13 (in the present embodiment, the coordinate of an "initial touched (or pressed) position" (described later) is set up). In a case where the action execution condition for the player character is met, "1" is set for the corresponding action. In a case where the action execution condition for the player character is not met, "0" is set to the corresponding action.

The action execution condition for the player character is met or satisfied based on a position of an operating section constituting the virtual controller (described later). In the present embodiment, a walking action or running action of the player character is determined in accordance with the display position of the operating section.

Here, the virtual controller according to the present embodiment will be described.

Figure 3:
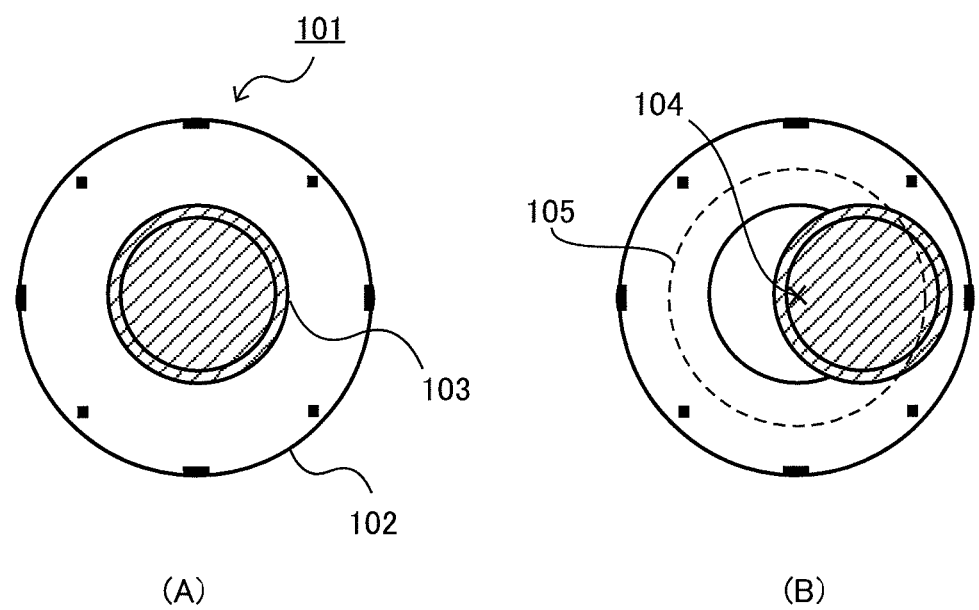
FIGS. 3A and 3B are explanatory drawings each showing an example of a virtual controller.

FIG. 3 is an explanatory drawing showing an example of the virtual controller according to the present embodiment. As shown in FIG. 3A, a virtual controller 101 is constructed from a controller body 102 formed in a substantially circular shape and an operating section 103 capable of moving in an arbitrary direction from a center position of the controller body 102. Meanwhile, a shape or a configuration of the virtual controller 101 is not limited to this configuration.

In the present embodiment, the virtual controller 101 is fixedly displayed with its center at a touched position (initial touched position) in a case where the display screen is touched by the user (that is, when a touch on the display screen by means of a touch with a finger of the user on the display screen (contact operation) is received). Otherwise, the virtual controller 101 may be displayed at a position that is somewhat shifted from the touched position of the display screen. In this case, it may be configured so that the user determines the display position of the virtual controller 101 with respect to the touched position.

FIG. 3A is an explanatory drawing showing the virtual controller 101 immediately after it is displayed on the display screen. As shown in FIG. 3A, the operating section 103 is arranged at the center of the controller body 102 (that is, an initial position of the operating section 103), and is displayed so as to be capable of moving in response to operations by the user. In the present embodiment, the user's operation is like a dragging operation, that is, an operation of moving a touched position while keeping a finger and the like touching on the display screen.

Namely, for example, when the dragging operation to a right direction is received from the player at the state where the virtual controller 101 is displayed on the display screen, as shown in FIG. 3B, the operating section 103 is displayed so as to be moved from the initial position to the right direction. In addition, an amount of movement of the operating section 103 and a moving direction thereof against the initial position are determined in accordance with a distance and a direction from an initial touched position to a touched position after the dragging operation (i.e., a current touched position) within a predetermined mobile range. Namely, for example, the longer the distance between the initial touched position and the current touched position is, the largely the operating section 103 is shifted from the initial position.

Here, as mentioned in the explanation of the virtual controller information (see FIG. 2), in the present embodiment, an action that the player character carries out varies depending upon whether a part of the operating section 103 is moved outside of a display region of the controller body 102 or not (that is, whether the center of the operating section 103 exceeds a movable region 105 or not). Further, in a case where the operating section 103 is positioned inside the display region of the controller body 102, an action that the player character carries out also varies depending upon whether the center of the operating section 103 is moved away from the initial position 104 by more than a predetermined distance or not. These are managed in the virtual controller managing table 12a. In the present embodiment, in a case where the center of the operating section 103 is moved away from the initial position 104 by more than a predetermined distance, "1" is set to the "walking action". In a case where the center of the operating section 103 exceeds the movable region 105, "0" is set to the "walking action" and "1" is set to the "running action". An action relating to the virtual controller 101 will be described in detail together with an operation of the video game processing apparatus 100.

The display section 13 is a display device for displaying a game screen in response to operations by the player in accordance with control by the control section 11. The display section 13 is constructed by a liquid crystal display, for example.

The audio outputting section 14 has a function to output audio in response to operations by the user or an action of any character in accordance with control by the control section 11.

The operation receiving section 15 receives operational signals in response to operations by the player, and notifies the control section 11 of its result. In the present embodiment, the operation receiving section 15 receives operations by the player via a touch panel provided in the display section 13. Otherwise, the operation receiving section 15 may be configured so as to receive operations by the player via a controller such as a mouse or a game pad.

Next, an operation of the video game processing apparatus 100 according to the present embodiment will be described.

Figure 4:
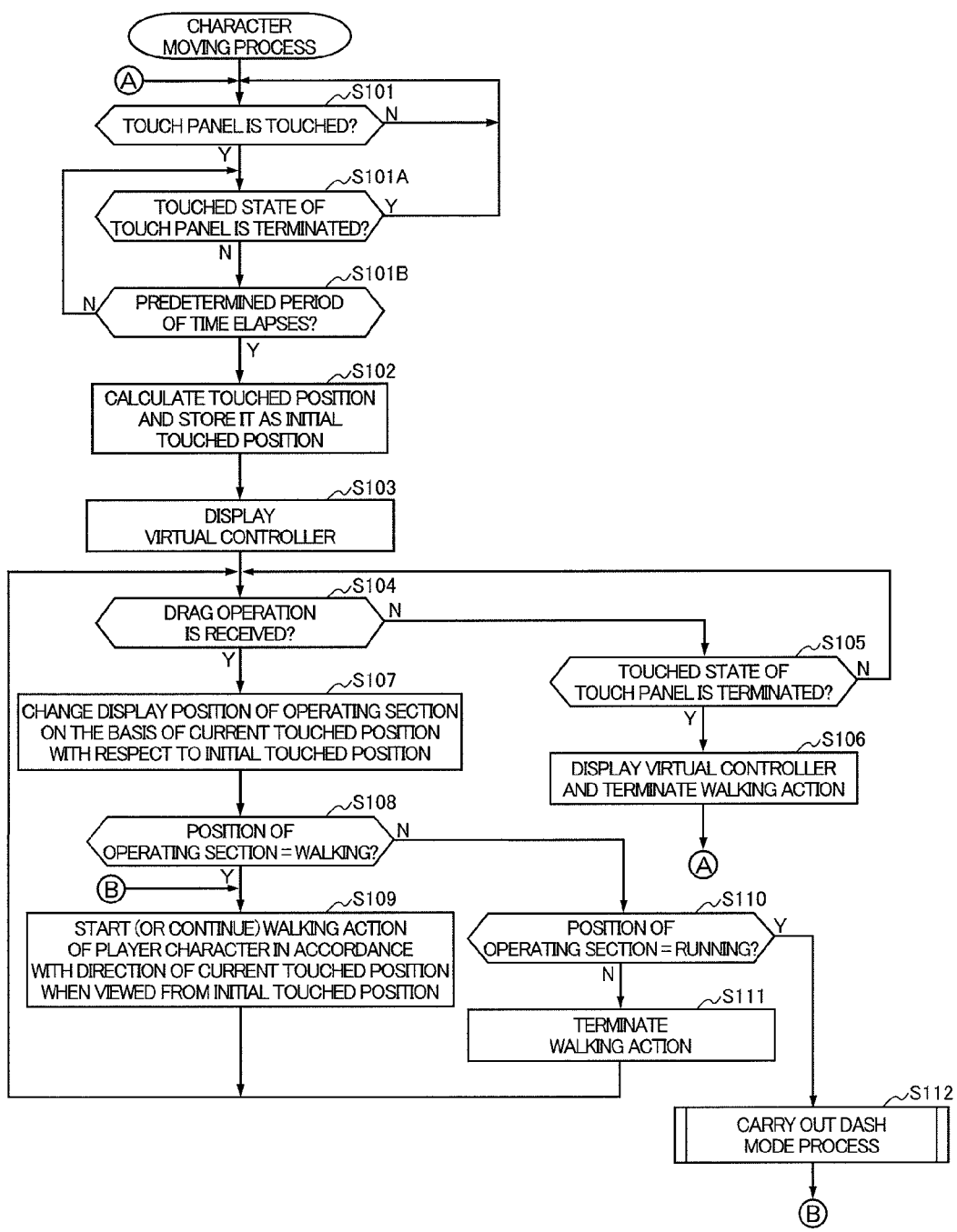
FIG. 4 is a flowchart showing an example of character moving processing.

FIG. 4 is a flowchart showing an example of character moving processing carried out by the video game processing apparatus 100. The character moving processing is started when a player character P1 becomes operable by the player P in accordance with progress of the video game.

In the character moving processing, processing for carrying out an action of the player character P1, which is an operational target, is carried out in response to operations by the player P using the virtual controller. In this regard, an explanation of any action and processing with no relationship to the present invention will be omitted.

Figure 5:
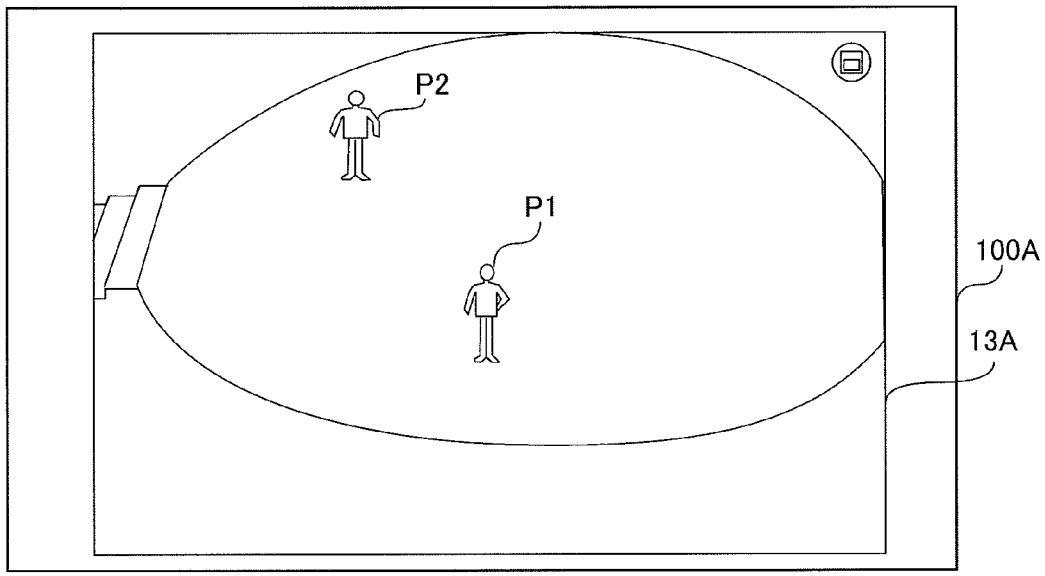
FIG. 5 is an explanatory drawing showing an example of a game screen.

FIG. 5 is an explanatory drawing showing an example of the game screen displayed on the display screen 13A of the display section 13, which is provided on a housing 100A of the video game processing apparatus 100. Here, as shown in FIG. 5, a description will be provided for an example to a case where the player character P1 which is in a state so as to be operated by the player P and a non-player character P2 operated by the control section 11 exist in a game field.

In the character moving processing, the control section 11 determines whether the display screen 13A is touched by the player P (that is, whether the touch panel provided in the display screen 13A is touched) (Step S101).

In a case where it is determined that the display screen 13A is touched ("Yes" at Step S101), the control section 11 determines whether the touched state of the display screen 13A (that is, the touch panel provided in the display screen 13A) is terminated or not (Step S101A). In a case where it is determined that the touched state of the display screen 13A is not terminated ("No" at Step S101A), the control section 11 determines whether a predetermined period of time (for example, 0.1 seconds) elapses since it is determined at Step S101 that the display screen 13A was touched (Step S101B). Ina case where it is determined that the touched state of the display screen 13A is terminated before the predetermined period of time elapses ("Yes" at Step S101A), the control section 11 causes the processing flow to return to Step S101. Thus, it is configured so that the processing is stopped in a case where the touched state of the display screen 13A is terminated before the predetermined period of time elapses. Therefore, it is possible to exclude a tap operation such as an instantaneous touch on the display screen 13A from a subject of the character moving processing. This makes it possible to not display the virtual controller 101 if it is not necessary. In this case, the tap operation may be received as a separate input operation from an operation for displaying the virtual controller 101.

In a case where it is determined that the predetermined period of time elapses before the touched state of the display screen 13A is terminated ("Yes" at Step S101B), the control section 11 calculates a touched position, and stores the calculated touched position in the virtual controller managing table 12a as an initial touched position (Step S102).

When the initial touched position is stored, the control section 11 causes the display section 13 to display the virtual controller 101 on the display screen 13A with its center at the initial touched position (Step S103).

Figure 6:
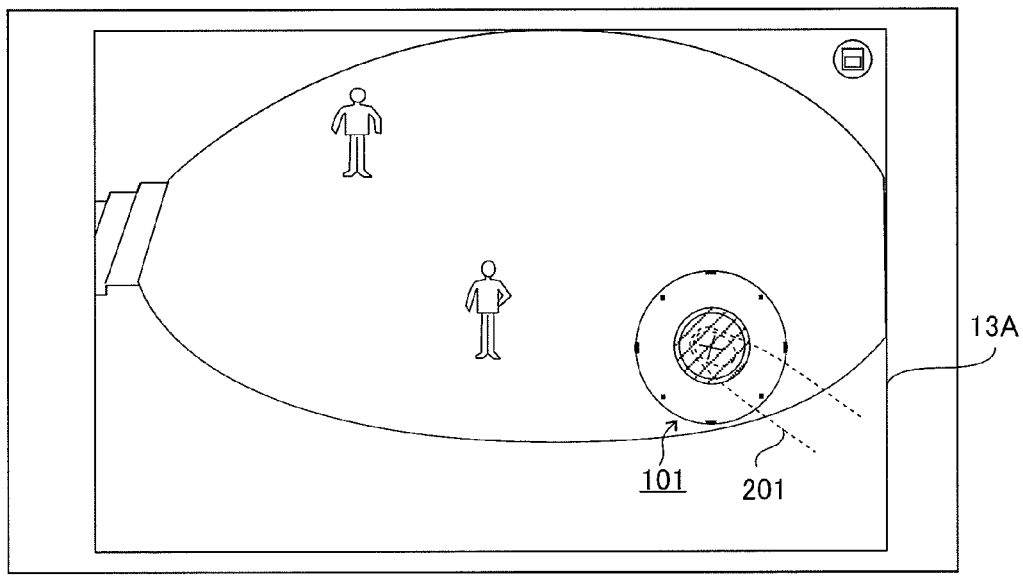
FIG. 6 is an explanatory drawing showing an example of the game screen.

FIG. 6 is an explanatory drawing showing an example of the game screen at this time. As shown in FIG. 6, for example, when a certain point on the display screen 13A is touched by means of a finger 201 of the player P, the virtual controller 101 is displayed with its center at the touched position.

When the virtual controller 101 is displayed, the control section 11 determines whether a dragging operation by the player P is received (Step S104).

In a case where it is determined that the dragging operation by the player P is not received ("No" at Step S104), the control section 11 determines whether the touched state of the display screen 13A (that is, the touch panel provided in the display screen 13A) is terminated (Step S105). Here, in a case where it is determined that the touched state of the display screen 13A is not terminated ("No" at Step S105), the control section 11 causes the processing flow to return to Step S104.

On the other hand, in a case where it is determined that the touched state of the display screen 13A is terminated ("Yes" at Step S105), the control section 11 terminates display of the virtual controller 101. Further, in a case where the player character P1 carries out a walking action, the control section 11 terminates the walking action (Step S106), and causes the processing flow to return to Step S101.

On the other hand, in a case where it is determined at Step S104 that the dragging operation by the player P is received ("Yes" at Step S104), the control section 11 changes a display position of the operating section 103 based on the current touched position with respect to the initial position (Step S107).

When the display position of the operating section 103 is changed, the control section 11 refers to the virtual controller managing table 12a, and determines whether the position of the operating section 103 indicates "walking" or not (Step S108). Here, in a case where it is determined that the position of the operating section 103 indicates the "walking" ("Yes" at Step S108), the control section 11 starts (or continues) processing necessary for a walking action of the player character P1 in a direction at which the operating section 103 is displayed viewed from the initial position (that is, a direction from the initial touched position to the current touched position) (Step S109), and causes the processing flow to return to Step S104.

Figure 7:
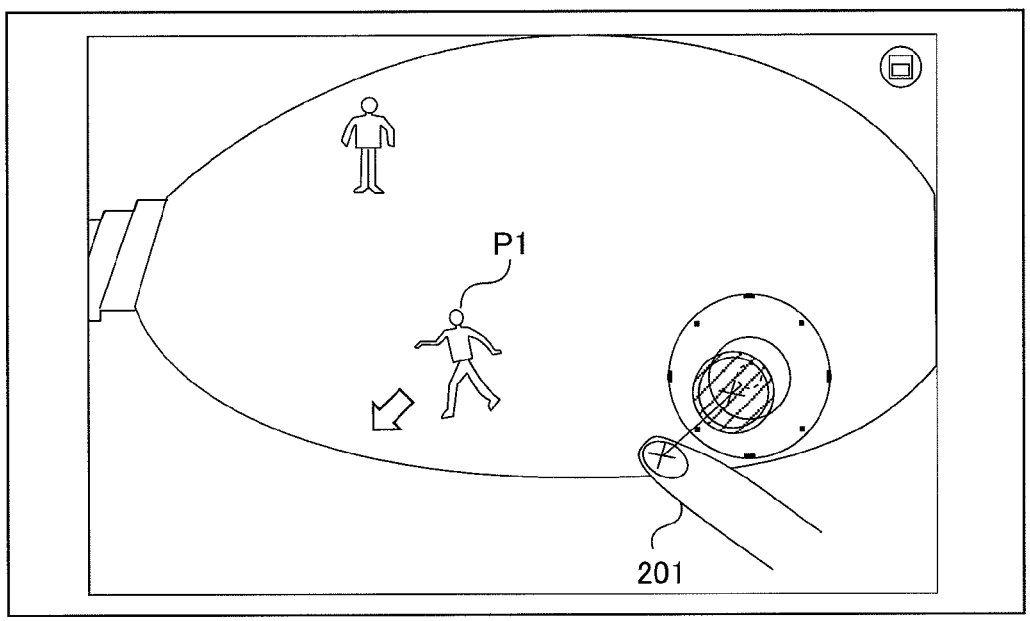
FIG. 7 is an explanatory drawing showing an example of the game screen.

FIG. 7 is an explanatory drawing showing an example of the game screen at this time. As shown in FIG. 7, a walking action of the player character P1 is carried out toward the same direction as the direction from the initial touched position to the current touched position by means of the finger 201 of the player P.

On the other hand, in a case where it is determined that the position of the operating section 103 does not indicate the "walking" ("No" at Step S108), the control section 11 determines whether the position of the operating section 103 indicates "running" (Step S110). Here, in a case where it is determined that the position of the operating section 103 does not indicate the "running" ("No" at Step S110) and the player character P1 carries out a walking action, the control section 11 terminates the walking action (Step S111), and causes the processing flow to return to Step S104.

On the other hand, in a case where it is determined that the position of the operating section 103 indicates the "running" ("Yes" at Step S110), the control section 11 carries out dash mode processing (Step S112), and causes the processing flow to return to Step S108.

The character moving processing is terminated when the progress of the video game becomes a state where the player is not able to input any operation to the player character P1.

Further, the character moving processing according to the present embodiment is designed so that the display position of the operating section 103 varies in a stepwise manner in accordance with a distance between the initial touched position and the current touched position. Namely, for example, when the distance between the initial touched position and the current touched position becomes the predetermined distance or more, the display position of the operating section 103 is changed from the initial position to the predetermined position.

Next, the dash mode processing will be described.

Figure 8:
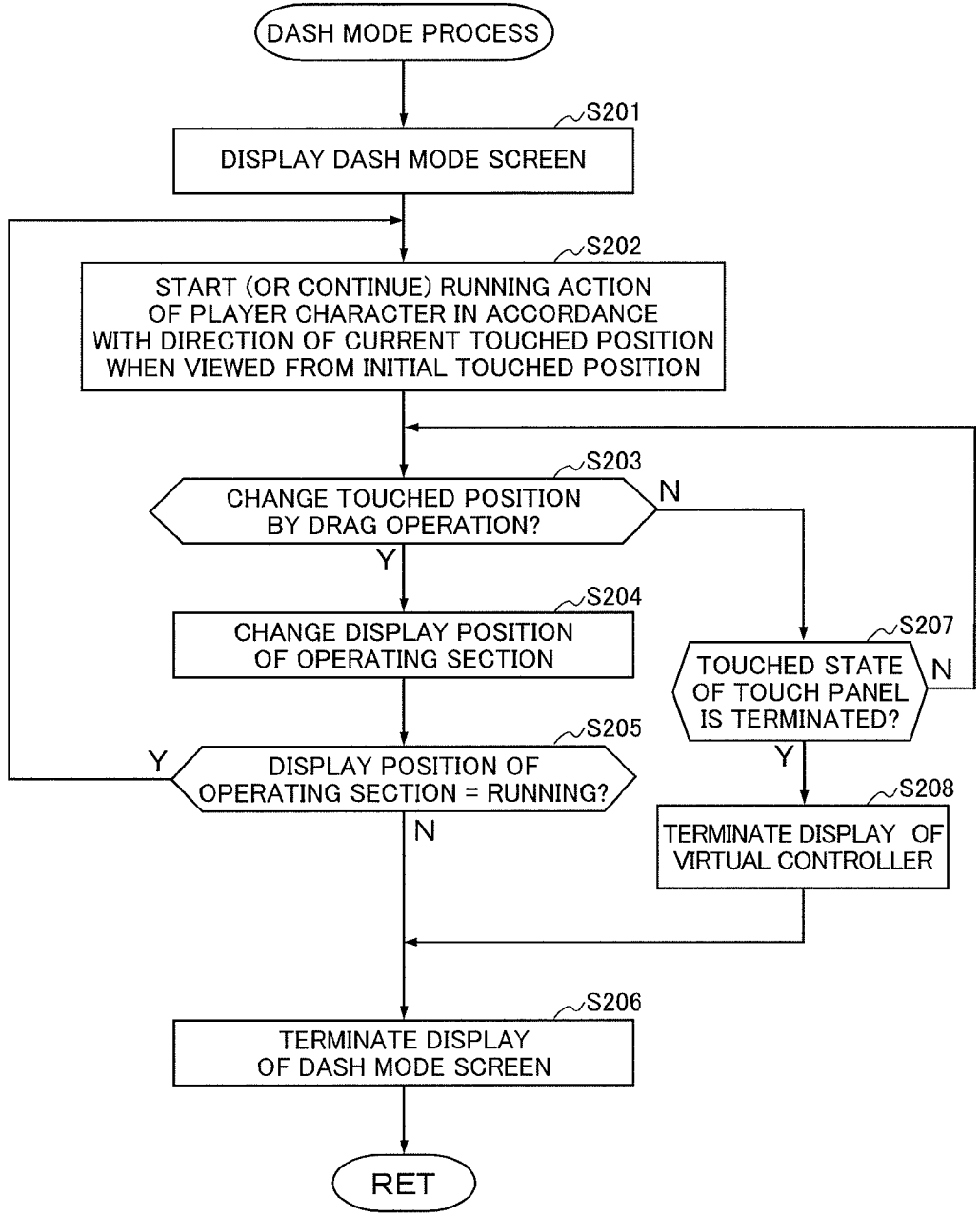
FIG. 8 is a flowchart showing an example of dash mode processing.

FIG. 8 is a flowchart showing an example of the dash mode processing carried out by the video game processing apparatus 100.

In the dash mode processing, the control section 11 first switches the game screen displayed on the display screen 13A to the dash mode screen (Step S201). Here, the dash mode screen is a screen for clearly showing to the player P that the player character P1 carries out a running action. In the present embodiment, on the dash mode screen, the transparency of the virtual controller 101 is increased or decreased in accordance with the distance between the initial touched position and the current touched position. Switching the transparency of the virtual controller as described above gives the player feedback that the display mode is switched to the dash mode. In addition, the visibility of the game screen is improved.

When the dash mode screen is displayed, the control section 11 carries out processing necessary for starting (or continuing) a running action of the player character P1 in accordance with a direction of the current touched position viewed from the initial touched position (Step S202).

Figure 9:
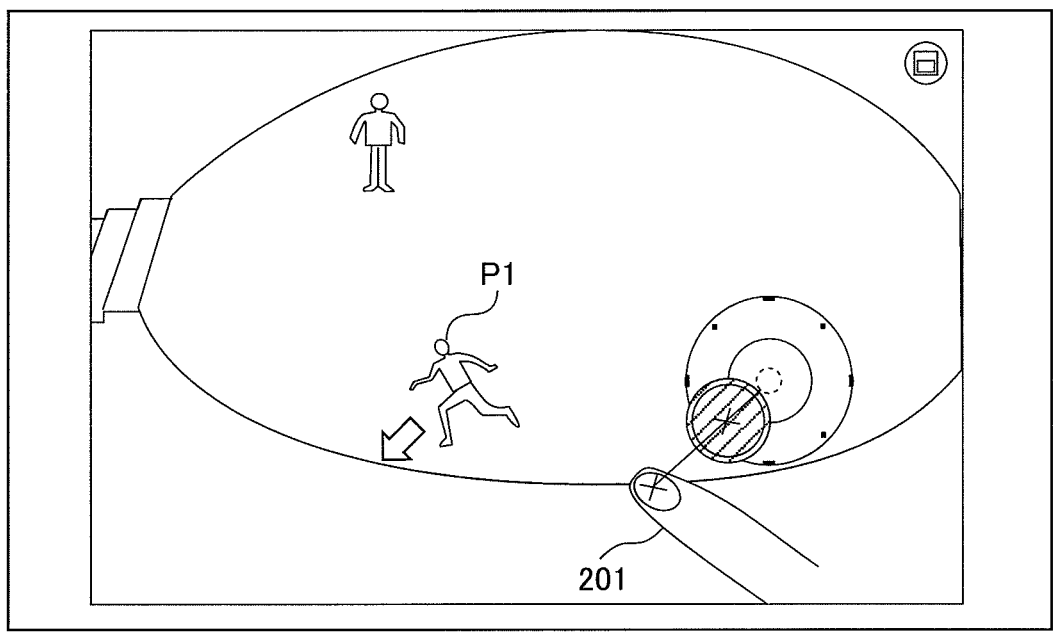
FIG. 9 is an explanatory drawing showing an example of the game screen.

FIG. 9 is an explanatory drawing showing an example of the game screen at this time. As shown in FIG. 9, the player character P1 carries out a running action toward the same direction as the direction from the initial touched position to the current touched position by means of the finger 201 of the player P. In this case, the control section 11 controls so that the longer the distance between the initial touched position and the current touched position is, the faster a movement speed of the player character P1 is.

Subsequently, the control section 11 determines whether the touched position of the display screen 13A is changed by means of the dragging operation by the player P (Step S203). Here, in a case where it is determined that the touched position is changed by means of the dragging operation ("Yes" at Step S203), the control section 11 changes the display position of the operating section 103 in accordance with the initial touched position and the current touched position (Step S204).

When the display position of the operating section 103 is changed, the control section 11 determines whether the display position of the operating section 103 indicates a running action of the player character P1 or not (Step S205). Here, in a case where it is determined that the display position of the operating section 103 does not indicate the running action of the player character P1 ("No" at Step S205), the control section 11 causes the processing flow to return to Step S202.

On the other hand, in a case where it is determined that the display position of the operating section 103 indicates the running action of the player character P1 ("Yes" at Step S205), the control section 11 terminates the display of the dash mode screen (Step S206), and causes the processing flow to return to Step S108 in the character moving processing (see FIG. 4).

On the other hand, in a case where it is determined at Step S203 that a touched position is not changed by means of a dragging operation ("No" at Step S203), the control section 11 determines whether a touched state on the display screen 13A (touch panel provided in the display screen 13A) is terminated (Step S207). Here, in a case where it is determined that the touched state of the display screen 13A is not terminated ("No" at Step S207), the control section 11 causes the processing flow to return to Step S203. In a case where it is determined that the touched state of the display screen 13A is terminated ("Yes" at Step S207), the control section 11 terminates the display of the virtual controller (Step S208), and causes the processing flow to return to Step S206.

Although the video game processing apparatus 100 has been provided as an example in the embodiment described above, the present invention can be applied to any device so long as it is a device that carries out user interface processing using an input device such as a touch panel. Therefore, the similar processing to that of the above embodiments may be carried out in the user interface processing for an operation of an object (element in the user interface) in any other applications than the video game.

As explained above, in the embodiment described above, the user interface processing apparatus (for example, video game processing apparatus 100) for controlling an application is configured so as to: receive a touch on the display screen 13A by means of a contact operation by the player P on the touch panel; detect a touched position on the display screen 13A when the touch on the display screen 13A is received (for example, initial touched position); display the virtual controller 101 at a predetermined position based on to the detected touched position (for example, with its center at the initial touched position) in a case where the touch on the display screen 13A is received; receive an operation of the virtual controller 101 displayed on the display screen 13A; and control the application (for example, video game) in response to the received operation. Therefore, it becomes possible to improve operability of the touch device.

Namely, the virtual controller can be displayed at an arbitrary point on the display screen and the operational target object can be operated in accordance with changes in the touched position until the touch on the touch panel is terminated. Thus, for example, it is possible to prevent an important portion (i.e., an important area or region on the display screen) from becoming a blind area by displaying the virtual controller in another portion, which is not important.

Further, it is possible to arrange the virtual controller at an arbitrary position. Thus, the operability of the touch device is hardly deteriorated depending on a size of a user's hand of the user and a method of gripping the touch device (for example, a position on the display screen at which the user finds it easily carry out a touch operation may be different depending upon whether the user grips the touch device laterally or vertically). Further, even in a case where the touch device is gripped with one hand, operability of the touch device is also hardly deteriorated.

Further, in the embodiment described above, the user interface processing apparatus (for example, video game processing apparatus 100) may be configured so as to: determine whether the touched state of the display screen 13A is terminated after the touch on the display screen 13A was received; and terminate the display of the virtual controller in a case where it is determined that the touched state is terminated. Therefore, the display of the virtual controller can be terminated when an operation of the virtual controller by the user is terminated. Namely, the virtual controller can be displayed only when necessary, and the display screen can be utilized widely by not displaying the virtual controller when not necessary. Therefore, it becomes possible to improve operability of the touch device.

Further, in the embodiment described above, the user interface processing apparatus (for example, video game processing apparatus 100) may be configured so as to: continuously detect the touched position until the touched state is terminated after the touch on the display screen 13A is received; receive the moving direction instruction operation (for example, dragging operation) specified by the direction from the initial touched position on the display screen detected when the touch on the display screen 13A is first received to the current touched position on the display screen 13A detected after the initial touched position was detected; and carry out control to move the object in the application (for example, player character P1) in the direction from the initial touched position to the current touched position in accordance with the received moving direction instruction operation. Therefore, the moving direction instruction operation of the object displayed on the display screen can be carried out simply.

Further, in the embodiment described above, the user interface processing apparatus (for example, video game processing apparatus 100) may be configured so that the virtual controller 101 includes the controller body 102 formed in a substantially circular shape and the operating section 103 capable of moving in an arbitrary direction from the center position of the controller body 102. In this case, the controller body 102 is displayed at a predetermined fixed position in accordance with the initial touched position (for example, with its center at the initial touched position), and the operating section 103 is displayed movably in the direction from the initial touched position to the current touched position using the center position of the controller body 102 as a base point. Therefore, a user can easily recognize how an operation input by the user is reflected.

Further, in the embodiment described above, the user interface processing apparatus (for example, video game processing apparatus 100) may be configured so that a movement speed instruction operation (for example, dragging operation) specified based upon a distance between the initial touched position and the current touched position is received. The user interface processing apparatus may further be configured to control the object (for example, player character P1) to move at the speed according to the distance between the initial touched position and the current touched position in response to the received movement speed instruction operation (for example, a walking action or running action is carried out in accordance with the position of the operating section 103 whose display position is determined based upon the distance between the initial touched position and the current touched position). Therefore, it is possible to change the action of the object, which is an operational target, by means of a simple operation. Further, by configuring the user interface processing apparatus so as to add the movement speed in accordance with the distance between the initial touched position and the current touched position in an analog manner, the user is allowed to easily adjust the movement speed of the object serving as an operational target.

In this case, the user interface processing apparatus may receive the movement speed instruction operations in a predetermined number of levels so that the movement speed of the object is specified at the levels respectively in accordance with a distance interval between the initial touched position and the current touched position. Alternatively, the user interface processing apparatus may receive an operation to gradually change the movement speed of the object in an analog manner in accordance with the distance between the initial touched position and the current touched position. In the latter case, for example, as the distance between the initial touched position and the current touched position becomes longer, the movement speed instruction operation is gradually changed in the order of walking, trot, running and dash, and the movement speed of the object becomes faster gradually.

Further, in the embodiment described above, the user interface processing apparatus (for example, video game processing apparatus 100) may be configured so that the virtual controller 101 includes the controller body 102 formed in a substantially circular shape and the operating section 103 capable of moving in an arbitrary direction from a center position of the controller body 102. In this case, the controller body 102 is displayed at the predetermined fixed position (for example, with its center at the initial touched position) in accordance with the initial touched position. Further, the operating section 103 is displayed as being able to move in a direction from the initial touched position to the current touched position using the center position of the controller body 102 as a base point so as to move away from the initial touched position in a stepwise manner in accordance with the distance between the initial touched position and the current touched position. Therefore, a user is able to easily recognize how an operation input by the user is reflected.

Further, in the embodiment described above, the user interface processing apparatus (for example, video game processing apparatus 100) may be configured so that the transparency of the virtual controller 101 is increased or decreased in accordance with the distance between the initial touched position and the current touched position. In this case, even when the distance between the initial touched position and the current touched position becomes longer, it becomes possible to improve visibility of the game screen.

Further, in the embodiment described above, the user interface processing apparatus (for example, video game processing apparatus 100) may be configured so that the virtual controller 101 is displayed in a case as long as the touched state on the display screen 13A continues for a predetermined period of time after a touch on the display screen 13A is first received. This makes it possible to display the virtual controller 101 only when necessary, and there is no fear to bring an operator (or player) confusion.

Although it has not been mentioned particularly in the embodiment described above, the video game processing apparatus 100 may be configured so as to: display a predetermined event icon on the display screen 13A in a case where the movement control (for example, walking or running) for the player character P1 is carried out in response to an operation of the virtual controller 101 and thereby a predetermined event condition for causing an event such as a conversation with other character to occur in the video game is met; and carry out a corresponding event in a case where the touched state is terminated in the state in which the event icon is displayed or the event icon is selected. By configuring the video game processing apparatus 100 in this manner, it becomes possible to improve operability of the touch device further.

Hereinafter, a description will be provided related to a case where a corresponding event is carried out when an event icon displayed on the display screen 13A is selected with reference to the appending drawings.

Figure 10:
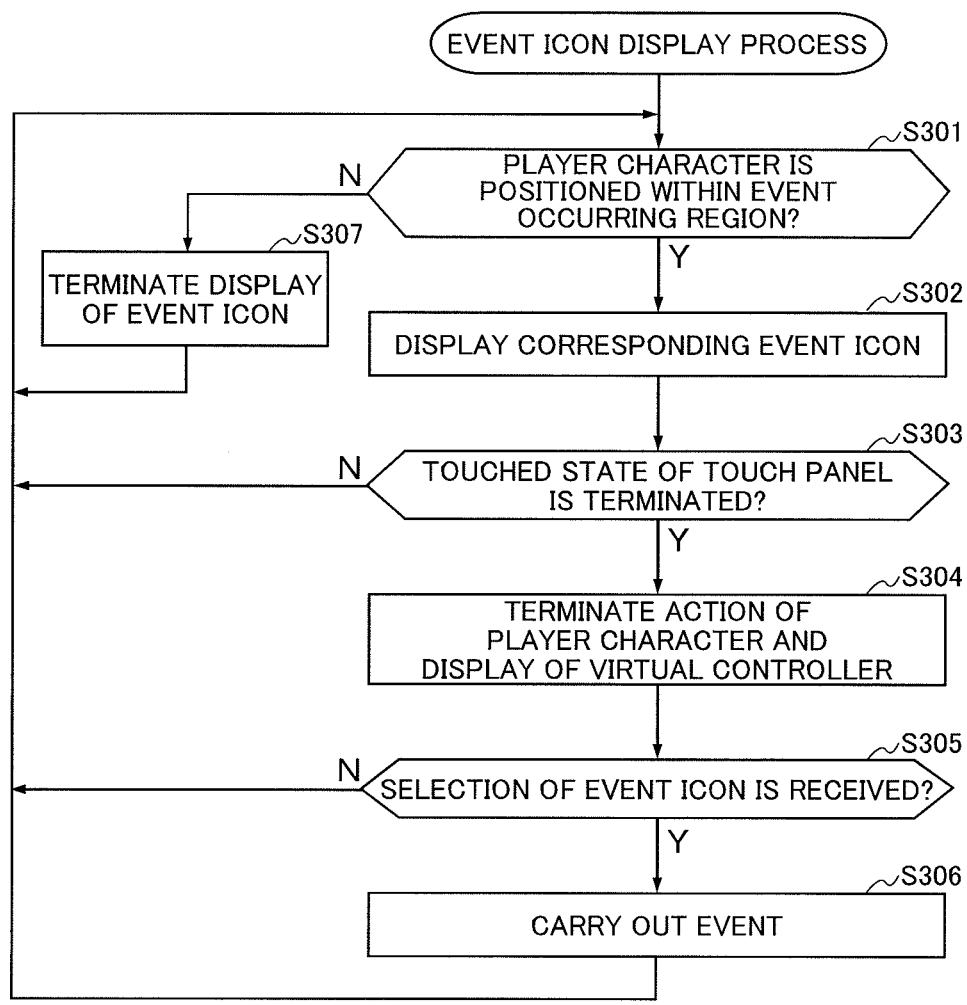
FIG. 10 is a flowchart showing an example of event icon displaying processing.

FIG. 10 is a flowchart showing an example of event icon displaying processing carried out by the video game processing apparatus 100. The event icon displaying processing is started when the player character P1 becomes in an operable state by means of an operation by the player P in accordance with the progress of the video game.

In the event icon displaying processing, the control section 11 first determines whether the player character P1 is positioned within an event occurring region or not (Step S301). Here, the event occurring region means a region in which a predetermined event occurring condition is met. For example, in a case where an event is a "conversation", an event occurring region is provided for each of the other characters within a predetermined distance from a display position of the other characters.

In a case where it is determined that the player character P1 is positioned in the event occurring region ("Yes" at Step S301), the control section 11 causes the display screen 13A to display an event icon corresponding to the event occurring region (Step S302). In this case, the event icon may be displayed in the vicinity of the event occurring region or in the vicinity of the virtual controller 101.

Figure 11:
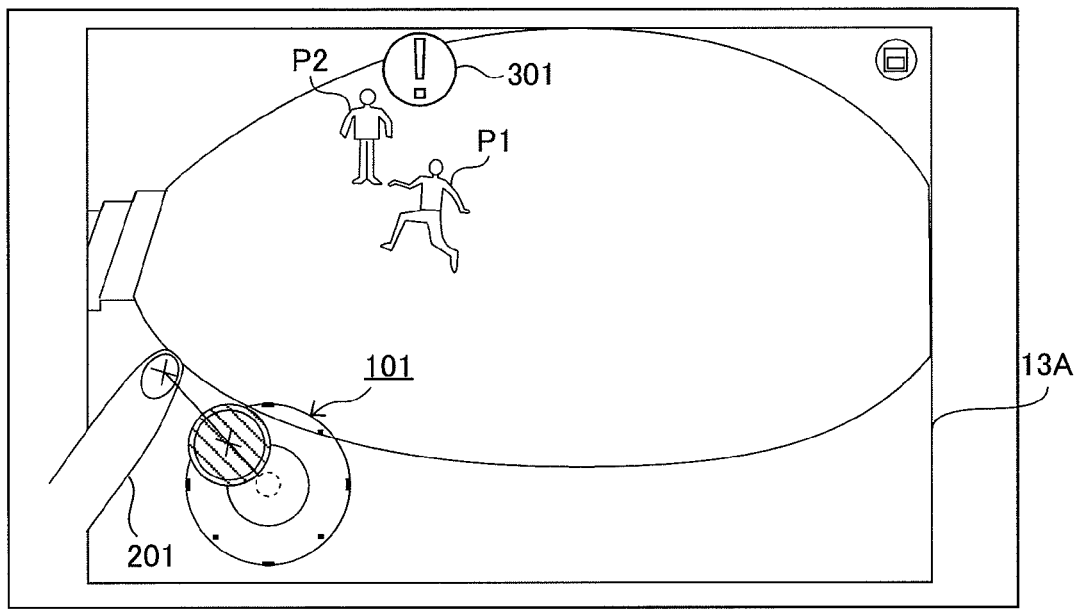
FIG. 11 is an explanatory drawing showing an example of the game screen.

FIG. 11 is an explanatory drawing showing an example of the game screen at this time. As shown in FIG. 11, a game screen displayed on the display screen 13A includes: the virtual controller 101 displayed in response to an operation by the player P; the player character P1 for which movement control is carried out; the non-player character P2; and an event icon 301 which is displayed because the player character P1 is positioned within an event occurring region for the non-player character P2.

When the event icon is displayed, the control section 11 determines whether the touched state of the display screen 13A (that is, the touch panel provided in the display screen 13A) is terminated (Step S303). Here, in a case where it is determined that the touched state is not terminated ("No" at Step S303), the control section 11 causes the processing flow to return to Step S301.

On the other hand, in a case where it is determined that the touched state is terminated ("Yes" at Step S303), the control section 11 terminates an action (walking action or running action) of the player character P1 and the display of the virtual controller 101 (Step S304), and receives a selection of the event icon 301 by touching the display position of the event icon 301 (Step S305). Here, in a case where the selection of the event icon 301 is not received ("No" at Step S305), the control section 11 causes the processing flow to return to Step S301.

On the other hand, when the selection of the event icon 301 is received ("Yes" at Step S305), the control section 11 carries out processing necessary for an event corresponding to the event icon 301, that is, a conversation event between the player character P1 and the non-player character P2 (Step S306), and then causes the processing flow to return to Step S301.

In this regard, in a case where it is determined at Step S301 that the player character P1 is not positioned within the event occurring region ("No" at Step S301) and the event icon 301 is displayed, the control section 11 terminates the display of the event icon 301 (Step S307), and causes the processing flow to return to Step S301.

By configuring the video game processing apparatus 100 as described above, it is possible to further improve operability of the touch device.

Although it has not been mentioned particularly in the embodiment described above, the video game processing apparatus 100 may be configured so as to change the transparency of the virtual controller 101 in accordance with a player's skill level and the like. In this case, the skill may be determined based on a total play time, the number of cleared stages and the like, for example. Further, the skill level may be determined based upon actions by the player, for example, based upon whether a specific operation in an application (for example, dash operation) is utilized or not, whether a specific condition (for example, running without hit of a wall) set up in advance is met or not, or whether one or more special item (s) is acquired or not.

It is thought that there is no need to clearly display the virtual controller 101 if the player gets used to the operations. For example, there will be no problem even if the transparency of the virtual controller 101 is caused to increase in accordance with the skill level of the player, and thereby even if the virtual controller gets completely transparent (i.e., not displayed) to an advanced-level player.

As described above, the user interface processing apparatus (for example, video game processing apparatus 100) may be configured so that the player's skill level is determined in accordance with a control status of the application (for example, a progress status of the video game such as total play time and the number of cleared stages, or a control status based on an action of the player) and the virtual controller 101 whose transparency is increased is displayed at a predetermined position according to the initial touched position in accordance with the degree of the skill level thus determined. In this case, for example, with respect to a player with high level of skill, the virtual controller 101 can be displayed without wholly covering the display screen or the virtual controller 101 can be caused to be not displayed. It is possible to visibly display a virtual displayed state (displayed object) of the virtual controller 101, on which the virtual controller 101 is superimposed. Therefore, it is possible to improve visibility without disturbing operations by the player, and the display screen can be used widely. In particular, since the virtual controller 101 is not always displayed at a fixed position, the effect is improved by increasing the transparency of the virtual controller 101.

Meanwhile, for example, the virtual controller 101 may be fixedly displayed at a lower left region of the display screen before the skill level of the player gets raised. In a case where the player's skill level is raised, the virtual controller 101 may be displayed at an arbitrary touched position like the embodiment described above. In such a case, the virtual controller 101 may be caused to be semitransparent or transparent in accordance with various progress statuses of the video game such as the player's skill level.

INDUSTRIAL APPLICABILITY

The present invention is useful to improve operability of a touch device using a touch panel in an operation on an application such as a game operation. Further, the present invention can be applied to general console game machines.

What is claimed is:

1. A user interface processing apparatus for controlling an application, the user interface processing apparatus comprising:
   a touch screen display that receives a touch on a display screen via a first operation by a user for contacting a touch panel;
   a processor; and
   a memory storing instructions that, when executed by the processor, cause the processor to perform operations including:
      determining a touched position on the display screen when the touch screen display receives the touch on the display screen;
      displaying a virtual controller at a predetermined position on the display screen corresponding to the touched position when the touch screen display receives the touch on the display screen;

determining a second operation of the virtual controller displayed on the display screen by the user, the second operation being received by the touch screen display; and controlling the application in accordance with the second operation received by the touch screen display, wherein the processor increases or decreases transparency of the virtual controller in accordance with a distance between an initial touched position and a current touched position, the initial touched position being a first position determined by the processor when the touch screen display first receives the touch on the display screen, the current touched position being a second position on the display screen currently determined by the processor after the initial touched position is received, the application is a video game, and a player character is controlled in the video game during a progress of the video game in accordance with the distance between the initial touched position and the current touched position, and a movement speed of the player character in the video game is controlled in accordance with the distance between the initial touched position and the current touched position.

2. The user interface processing apparatus according to claim 1, wherein the processor continuously determines the touched position until a touched state is terminated after the touch screen display receives the touch on the display screen, wherein the processor determines a moving direction instruction operation specified by a direction from the initial touched position to the current touched position, and wherein the player character moves in the application in the direction from the initial touched position to the current touched position in accordance with the moving direction instruction operation.

3. The user interface processing apparatus according to claim 1, the operations further including:

determining, after the touch screen display receives the touch on the display screen, whether a touched state on the display screen is terminated, wherein the processor terminates displaying the virtual controller when the touched state is terminated.

4. The user interface processing apparatus according to claim 1, wherein the virtual controller includes a controller body having a substantially circular shape and an operating section capable of moving in an arbitrary direction from a center position of the controller body, and wherein the processor fixedly displays the controller body at the predetermined position corresponding to the initial touched position, and movably displays the operating section in a direction from the initial touched position to the current touched position using the center position of the controller body as a base point.

5. The user interface processing apparatus according to claim 1, wherein the processor determines a movement speed instruction operation that is specified based upon the distance between the initial touched position and the current touched position, and wherein the player character moves at the movement speed according to the distance between the initial touched position and the current touched position in accordance with the movement speed instruction operation.

6. The user interface processing apparatus according to claim 5, wherein the virtual controller includes a controller body having a substantially circular shape and an operating section capable of moving in an arbitrary direction from a center position of the controller body, and wherein the processor fixedly displays the controller body at the predetermined position corresponding to the initial touched position, and displays the operating section so as to move away from the initial touched position in a stepwise manner in accordance with the distance between the initial touched position and the current touched position in a direction from the initial touched position to the current touched position using the center position of the controller body as a base point.

7. The user interface processing apparatus according to claim 1, wherein the processor displays the virtual controller when a touched state on the display screen continues for a predetermined period of time after the touch screen display first receives the touch on the display screen.

8. The user interface processing apparatus according to claim 1, wherein the user interface processing apparatus is a video game processing apparatus for controlling the progress of the video game as the application.

9. The user interface processing apparatus according to claim 1, wherein the player character is moved in the video game in a same direction as a direction from the initial touched position to the current touched position, and the virtual controller is fixedly displayed on the display screen at the predetermined position.

10. The user interface processing apparatus according to claim 1, wherein the virtual controller is fixedly displayed on the display screen at the predetermined position.

11. A user interface processing method of controlling an application, the user interface processing method comprising:

receiving a touch on a display screen via a first operation by a user for contacting a touch panel;

detecting a touched position on the display screen when the touch on the display screen is received;

displaying a virtual controller at a predetermined position on the display screen corresponding to the touched position when the touch on the display screen is received;

receiving a second operation of the virtual controller displayed on the display screen by the user; and controlling the application in accordance with the second operation, wherein a transparency of the virtual controller is increased or decreased in accordance with a distance between an initial touched position and a current touched position, the initial touched position being a first touched position detected on the display screen when the touch on the display screen is first received, the current touched position being a second touched position on the display screen currently detected after the initial touched position is detected, the application is a video game, and a player character is controlled in the video game during a progress of the video game in accordance with the distance between the initial touched position and the current touched position, and a movement speed of the player character in the video game is controlled in accordance with the distance between the initial touched position and the current touched position.

12. The user interface processing method according to claim 11, wherein the player character is moved in the video game in a same direction as a direction from the initial touched position to the current touched position, and the virtual controller is fixedly displayed on the display screen at the predetermined position.

13. A non-transitory computer-readable medium including a computer program product for processing a user interface so as to control an application, the computer program product causing a computer to execute:

receiving a touch on a display screen via a first operation by a user for contacting a touch panel;

detecting a touched position on the display screen when the touch on the display screen is received;

displaying a virtual controller at a predetermined position on the display screen corresponding to the touched position when the touch on the display screen is received;

receiving a second operation of the virtual controller displayed on the display screen by the user; and controlling the application in accordance with the second operation, wherein a transparency of the virtual controller is increased or decreased in accordance with a distance between an initial touched position and a current touched position, the initial touched position being a first touched position detected on the display screen when the touch on the display screen is first received, the current touched position being a second touched position on the display screen currently detected after the initial touched position is detected, the application is a video game, and a player character is controlled in the video game during a progress of the video game in accordance with the distance between the initial touched position and the current touched position, and a movement speed of the player character in the video game is controlled in accordance with the distance between the initial touched position and the current touched position.

14. The non-transitory computer-readable medium according to claim 13, wherein the player character is moved in the video game in a same direction as a direction from the initial touched position to the current touched position, and the virtual controller is fixedly displayed on the display screen at the predetermined position.

* * * * *